(12) United States Patent
Hemphill et al.

(10) Patent No.: US 11,618,509 B2
(45) Date of Patent: Apr. 4, 2023

(54) SUPPORT TUBE FOR A TAILGATE ASSEMBLY HAVING A DOOR SUBASSEMBLY

(71) Applicant: Ford Global Technologies, LLC, Dearborn, MI (US)

(72) Inventors: Joshua Robert Hemphill, White Lake, MI (US); Michael Shawn Watterworth, Brighton, MI (US); Dragan B. Stojkovic, Taylor, MI (US); Colleen Marie Hoffman, Canton, MI (US); John Comiez, Novi, MI (US); Donald Kreda, China, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 17/327,933

(22) Filed: May 24, 2021

(65) Prior Publication Data

US 2022/0371667 A1 Nov. 24, 2022

(51) Int. Cl.
*B62D 33/027* (2006.01)
*B62D 33/03* (2006.01)

(52) U.S. Cl.
CPC ..... *B62D 33/0273* (2013.01); *B62D 33/0276* (2013.01); *B62D 33/03* (2013.01)

(58) Field of Classification Search
CPC . B62D 33/0273; B62D 33/03; B62D 33/0276
See application file for complete search history.

(56) References Cited

U.S. PATENT DOCUMENTS

| | | | | |
|---|---|---|---|---|
| 5,685,594 | A * | 11/1997 | Harper | B62D 33/0273 296/57.1 |
| 6,742,826 | B2 * | 6/2004 | Humphrey | B62D 33/0273 296/57.1 |
| 6,994,363 | B2 | 2/2006 | Seksaria et al. | |
| 8,246,098 | B2 * | 8/2012 | Cheung | B62D 33/0273 296/146.12 |
| 8,740,279 | B1 * | 6/2014 | McGoff | B62D 33/0273 49/168 |
| 10,308,291 | B2 * | 6/2019 | Seki | B62D 33/03 |
| 11,325,451 | B2 * | 5/2022 | Nania | B60J 5/108 |
| 11,479,307 | B2 * | 10/2022 | Sridhar | B62D 33/077 |
| 2004/0174035 | A1 * | 9/2004 | Acker | B62D 33/0273 296/57.1 |
| 2004/0227368 | A1 * | 11/2004 | Seksaria | B60P 3/40 296/57.1 |

(Continued)

*Primary Examiner* — Gregory A Blankenship
(74) *Attorney, Agent, or Firm* — Vichit Chea; Carlson, Gaskey & Olds, P.C.

(57) ABSTRACT

A tailgate assembly includes a frame subassembly having a cargo bed access opening disposed between a driver side section and a passenger side section, and a door subassembly that is pivotably coupled to the frame subassembly and is pivotable relative to the frame subassembly back-and-forth between a door open position and a door closed position. The door subassembly closes the cargo bed access opening when the door subassembly is in the door closed position. The assembly further includes a tube of the frame subassembly. The tube extends along an inboard side of the driver side section, along an inboard side of the passenger side section, and along a bottom of the cargo bed access opening.

20 Claims, 5 Drawing Sheets

(56) References Cited

U.S. PATENT DOCUMENTS

| | | | |
|---|---|---|---|
| 2007/0085381 A1* | 4/2007 | Delaney | B62D 25/04 |
| | | | 296/193.08 |
| 2012/0324793 A1* | 12/2012 | Abbasi | B62D 33/0273 |
| | | | 49/168 |
| 2016/0236724 A1* | 8/2016 | Borges Filho | B60P 3/40 |
| 2019/0375467 A1* | 12/2019 | Tyagi | B62D 33/0273 |
| 2021/0245817 A1* | 8/2021 | Gibbs | B62D 33/0276 |
| 2021/0245818 A1* | 8/2021 | Van Norman | B62D 33/0273 |

* cited by examiner

SUPPORT TUBE FOR A TAILGATE ASSEMBLY HAVING A DOOR SUBASSEMBLY

TECHNICAL FIELD

This disclosure relates generally to a tailgate and, more particularly, to a support tube utilized within a tailgate having a door subassembly. The tube can be hydroformed.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed.

SUMMARY

A tailgate assembly according to an exemplary aspect of the present disclosure includes, among other things, a frame subassembly having a cargo bed access opening disposed between a driver side section and a passenger side section, and a door subassembly that is pivotably coupled to the frame subassembly and is pivotable relative to the frame subassembly back-and-forth between a door open position and a door closed position. The door subassembly closes the cargo bed access opening when the door subassembly is in the door closed position. The assembly further includes a tube of the frame subassembly. The tube extends along an inboard side of the driver side section, along an inboard side of the passenger side section, and along a bottom of the cargo bed access opening.

In another exemplary embodiment of the foregoing tailgate assembly, the frame subassembly and the door subassembly are pivotable together back-and-forth between a tailgate closed position and a tailgate open position.

In another exemplary embodiment of any of foregoing tailgate assemblies, the frame subassembly and the door subassembly pivot together about a horizontally extending axis. The door subassembly pivots relative to the frame subassembly about a vertically extending axis.

In another exemplary embodiment of any of foregoing tailgate assemblies, the bottom of the cargo bed access opening is a vertical bottom when the frame subassembly and the door subassembly are in the tailgate closed position.

In another exemplary embodiment of any of foregoing tailgate assemblies, the door subassembly is pivotably coupled to the tube of the frame subassembly.

In another exemplary embodiment of any of foregoing tailgate assemblies, the tube is hydroformed.

In another exemplary embodiment of any of foregoing tailgate assemblies, the tube is U-shaped.

In another exemplary embodiment of any of foregoing tailgate assemblies, the tube extends continuously and uninterruptedly from the inboard side of the driver side section, along the bottom of the cargo bed access opening, and to the inboard side of the passenger side section.

In another exemplary embodiment of any of foregoing tailgate assemblies, the tube is a single monolithic structure.

In another exemplary embodiment of any of foregoing tailgate assemblies, a cross-sectional profile of the tube along the bottom of the cargo bed access opening differs from a cross-sectional profile of the tube along the inboard side of the driver side section.

A tailgate manufacturing method according to another exemplary aspect of the present disclosure includes, among other things, hydroforming a tube to change a cross-sectional profile of the tube. The method further includes, within a tailgate assembly, connecting a driver side section of a frame subassembly to a passenger side section of the frame subassembly using the tube. The driver side section is on a driver side of a cargo bed access opening in the tailgate assembly. The passenger side section on a passenger side of the cargo bed access opening in the tailgate assembly. The method still further includes pivotably coupling a door subassembly of the tailgate assembly to the frame subassembly of the tailgate assembly so that the door subassembly is pivotable relative to the frame subassembly back-and-forth between a door open position and a door closed position. The door subassembly closes the cargo bed access opening when the door subassembly is in the door closed position.

In another exemplary embodiment of the foregoing method, the tube extends along a bottom of the cargo bed access opening.

In another exemplary embodiment of any of the foregoing methods, the frame subassembly and the door subassembly are pivotable together back-and-forth between a tailgate closed position and a tailgate open position. The bottom of the cargo bed access opening is a vertical bottom when the frame subassembly and the door subassembly are in the tailgate closed position.

In another example of any of the foregoing methods, the frame subassembly and the door subassembly pivot together about a horizontally extending axis. The door subassembly pivots relative to the frame subassembly about a vertically extending axis.

In another example of any of the foregoing methods, the hydroforming increases a cross-sectional area of the tube.

Another example of any of the foregoing methods includes bending the tube prior to the hydroforming.

In another example of any of the foregoing methods, the bending comprises bending the tube into a "U" shape.

In another example of any of the foregoing methods, the tube extends continuously and uninterruptedly from the inboard side of the driver side section, along a bottom of the cargo bed access opening, and to the inboard side of the passenger side section.

In another example of any of the foregoing methods, the door subassembly is pivotably coupled to the tube of the frame subassembly.

In another example of any of the foregoing methods, the tube is a single monolithic structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary tailgate assemblies that include door subassemblies. The tailgate assemblies can include a single tubular structure disposed along the sides and bottom of the door subassembly. The single, monolithic, tubular structure can be used instead of, for example, a plurality of brackets that are welded together. The tubular structure can be hydroformed.

FIGS. 1, 2, 3, and 4 illustrate select portions of a motor vehicle 10 that includes a cargo space for storing and/or hauling cargo. In the illustrated embodiment, the vehicle 10 is a pickup truck and the cargo space is established by a cargo bed 12 of the pickup truck. While a pickup truck with a cargo bed is specifically depicted and referenced herein, other vehicles having other types of cargo spaces could also benefit from the teachings of this disclosure. The vehicle 10 could also be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

Figure 1:
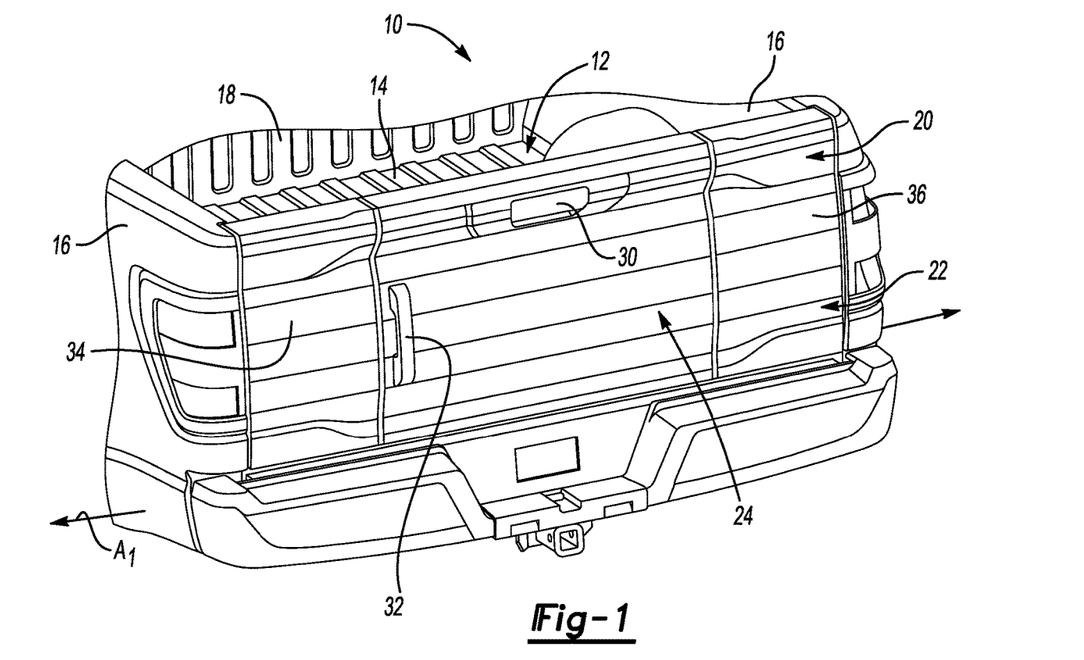
FIG. 1 is a rear perspective view of a motor vehicle equipped with a cargo space and a tailgate assembly positioned in a tailgate closed position relative to the cargo space.

The cargo bed 12 is generally rearward of a passenger cabin (not shown) of the vehicle 10 and includes a floor 14 extending between a pair of longitudinally extending side walls 16, a laterally extending front wall 18, and a tailgate assembly 20. The overall size, shape, and configuration of the cargo bed 12 are not intended to limit this disclosure.

The tailgate assembly 20 can be a Multi-Axis Tailgate that includes, among other things, a frame subassembly 22 and a door subassembly 24. The door subassembly 24 may sometimes be referred to as a "swing gate subassembly." The frame subassembly 22, in the exemplary embodiment, includes a driver side section 34, a passenger side section 36, and a connection member 38 (see FIG. 3) connected between the driver side section 34 and the passenger side section 36. The door subassembly 24 may be pivotably connected to either the driver side section 34 or the passenger side section 36 by at least one hinge assembly 35 (see FIG. 3).

Figure 2:
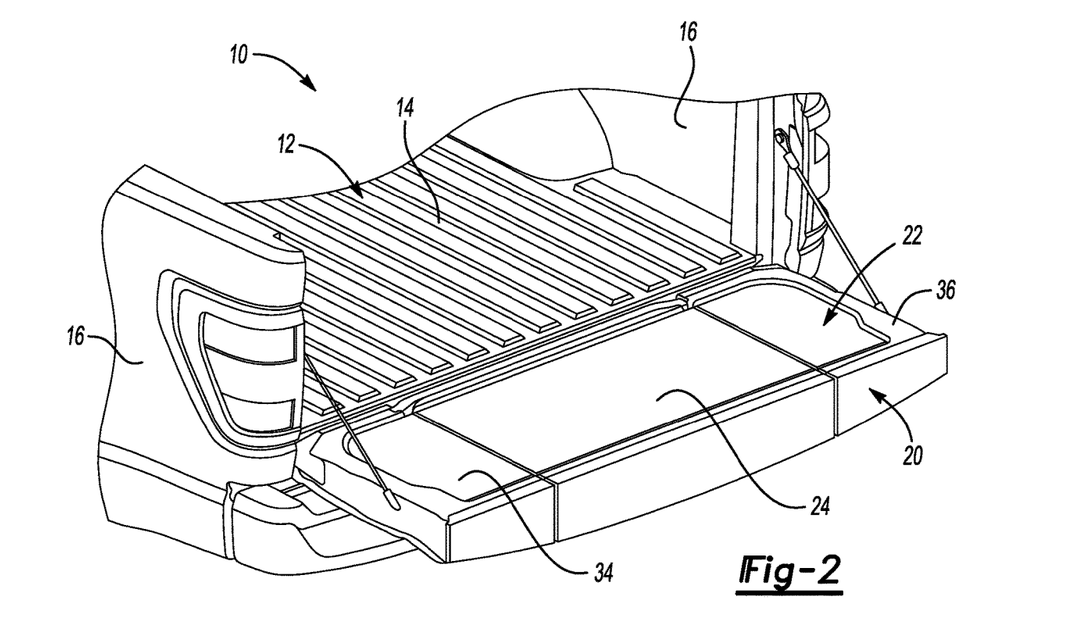
FIG. 2 illustrates the tailgate assembly of FIG. 1 in a tailgate open position.

The tailgate assembly 20 is pivotable about a first axis A1 relative to the cargo bed 12 between a tailgate closed position shown in FIG. 1 and a tailgate open position shown in FIG. 2. The tailgate assembly 20 may be moved from the tailgate closed position to the tailgate open position in response to actuating a first handle 30 of the tailgate assembly 20, for example. The tailgate assembly 20 is vertically aligned when in the tailgate closed position and thus generally encloses an end of the cargo bed 12 that is opposite from the front wall 18, and the tailgate assembly 20 is horizontally aligned when in the tailgate open position and thus generally allows access to the cargo bed 12. Vertical and horizontal, for purposes of this disclosure, are with reference to ground in the ordinary orientation of the vehicle 10 during operation.

The door subassembly 24 of the tailgate assembly 20 is in a door closed position and is latched to the frame subassembly 22 when the frame subassembly 22 and the door subassembly 24 are pivoted between the tailgate closed position and the tailgate open position. Thus, the frame subassembly 22 and the door subassembly 24 pivot together as a unit when the tailgate assembly 20 is transitioned back and forth between the tailgate closed position and the tailgate open position.

Figure 3:
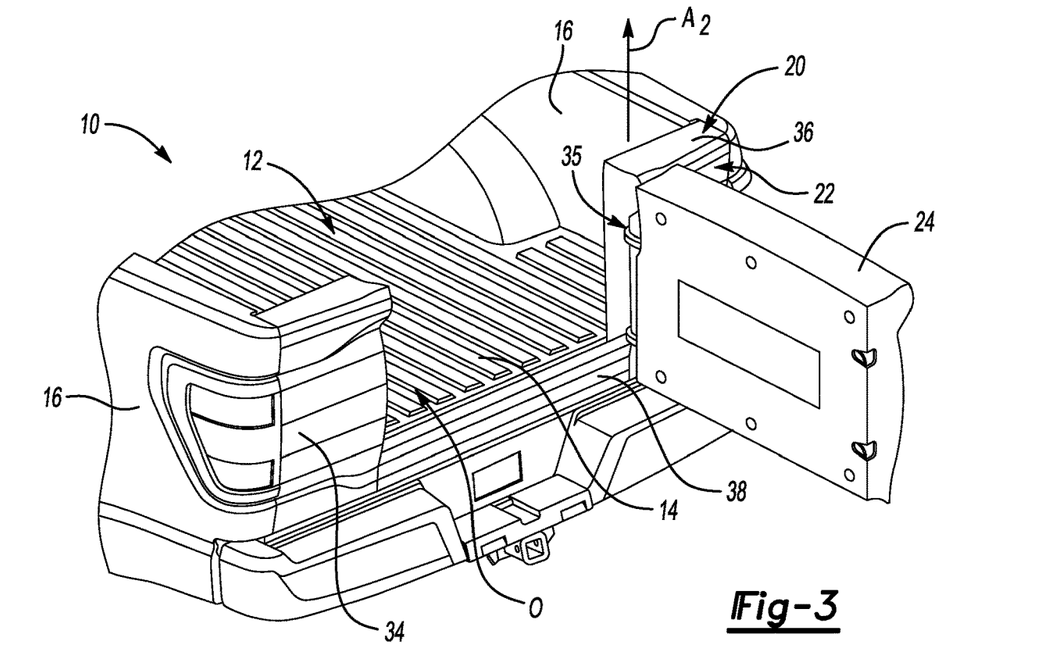
FIG. 3 illustrates a door subassembly of the tailgate assembly of FIG. 1 in a door open position.
Figure 4:
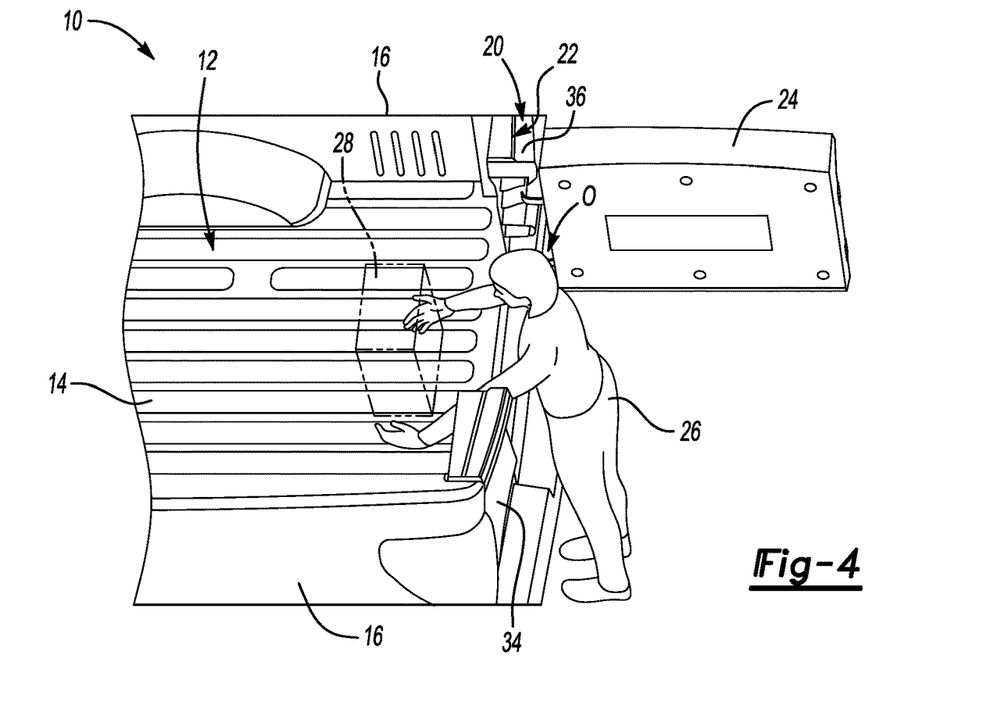
FIG. 4 is a rear and top view of the tailgate assembly and the door subassembly of FIG. 3.

When in the tailgate closed position, the door subassembly 24 is pivotable relative to the frame subassembly 22 about a second axis A2 between the door closed position shown in FIG. 1 and a door open position shown in FIG. 3. In an embodiment, the first axis A1 is a horizontally extending axis, and the second axis A2 is transverse to the first axis A1 and is a vertically extending axis. The door subassembly 24 may be moved between the door closed position and the door open position by grasping a second handle 32 (see FIG. 1) of the tailgate assembly 20, for example.

The door subassembly 24 provides a cargo bed access opening O when moved to the door open position. In an embodiment, the cargo bed access opening O extends vertically downward at least as far as the floor 14 of the cargo bed 12. A user 26 (see FIG. 4) can access the cargo bed 12 through the cargo bed access opening O when the door subassembly 24 is in the door open position. Placing the door subassembly 24 in the door open position allows the user 26 to move closer to the cargo bed 12 than, for example, when the tailgate assembly 20 is positioned in the tailgate open position of FIG. 2. The cargo bed access opening O can also provide clearance for the user 26 to enter the cargo bed 12 to either load or retrieve an item of cargo 28 (see FIG. 4).

Figure 5:
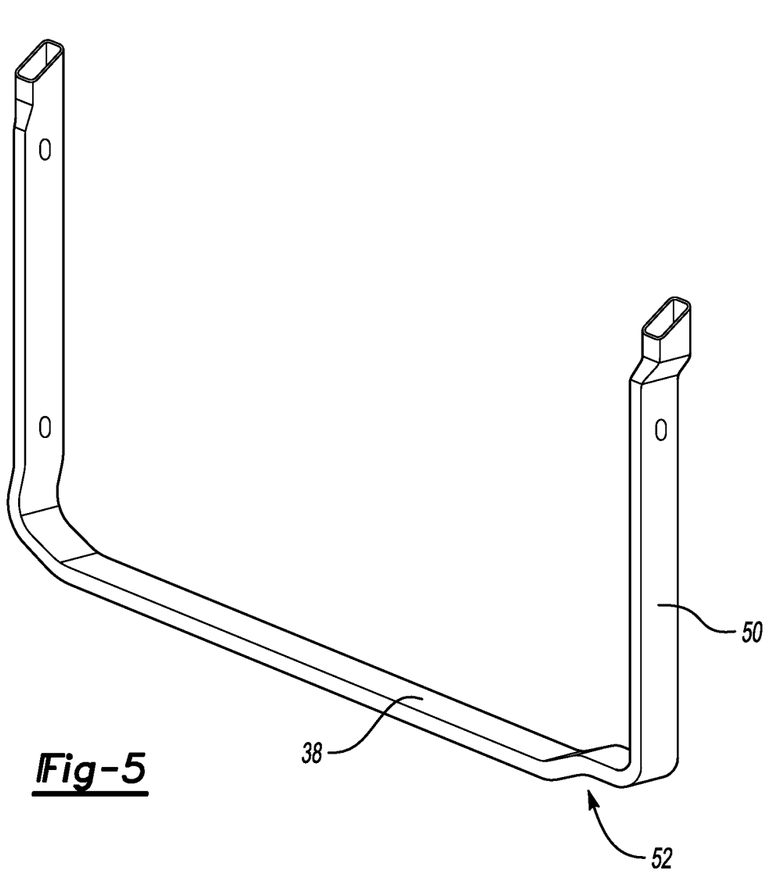
FIG. 5 is a perspective view of a tube from the tailgate assembly of FIG. 1.
Figure 6:
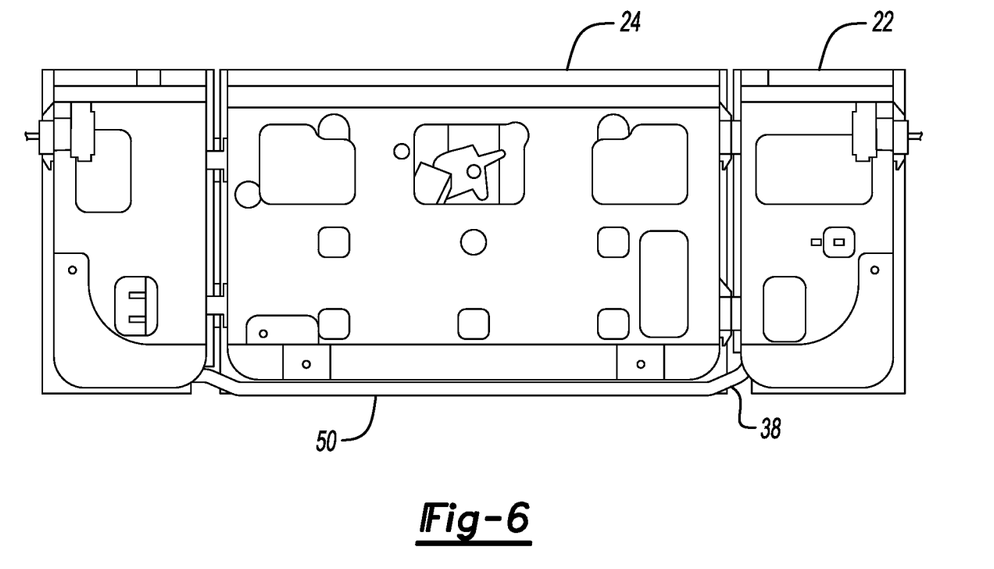
FIG. 6 is an inside view of the tailgate assembly of FIG. 1 with selected portions removed to show the hydroformed tube.
Figure 7:
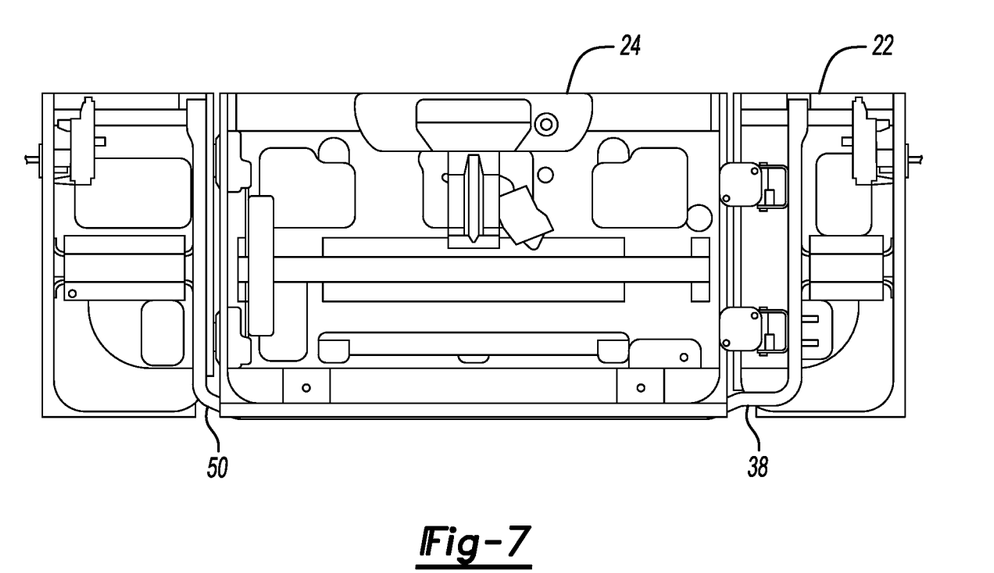
FIG. 7 is an outer view of the tailgate assembly of FIG. 1 with selected portions removed to show the hydroformed tube.

With reference now to FIGS. 5-7, the frame subassembly 22 includes a tube 50 that is U-shaped. The connection member 38 is provided by the tube 50 this example.

The tube includes a portion extending along an inboard side of the driver side section 34, a portion extending along a bottom of the cargo bed access opening O, and a portion extending along an inboard side of the passenger side section 36. The bottom of the cargo bed access opening O is a vertical bottom. Vertical is with reference to ground and an ordinary orientation of the vehicle 10 during operation.

The tube 50 extends continuously and uninterruptedly from the portion on the inboard side of the driver side section 34 to the portion on the inboard side of the passenger side section 36. In the past, separate brackets have been used within frame subassemblies. The separate brackets are then welded together to provide support along the inboard side of the driver side section 34 and the inboard side of the passenger side section 36. As can be appreciated, utilizing the tube 50 rather than a plurality of separate brackets that are welded together can reduces assembly time and part complexity.

The tube 50, in the example embodiment, has a jog 52 beneath a vertical leg of the tube 50. The jog 52 can help to strengthen this area of the tube 50. Strengthening this area may be desirable as the hinge assemblies 35 can be connected to the vertical leg of the tube 50 above the jog 52. The vertical leg of the tube 50 that is above the jog 52 carries the weight of the door subassembly 24, particularly when the door subassembly 24 is in the door open position.

The tube 50 can be steel. In this example, the tube 50 is hydroformed, which can provide facilitate establishing cross-sections that vary throughout the tube 50.

A person having skill in this art would be able to structurally distinguish a hydroformed tube from a tube that is not hydroformed. Thus, specifying that a tube is a hydroformed tube structurally distinguishes that tube from other tubes that are not hydroformed.

Figure 8A:
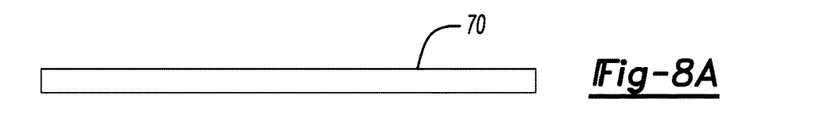
FIGS. 8A-8E illustrate stages in a method of hydroforming the tube of FIG. 5.
Figures 8B, 8C:
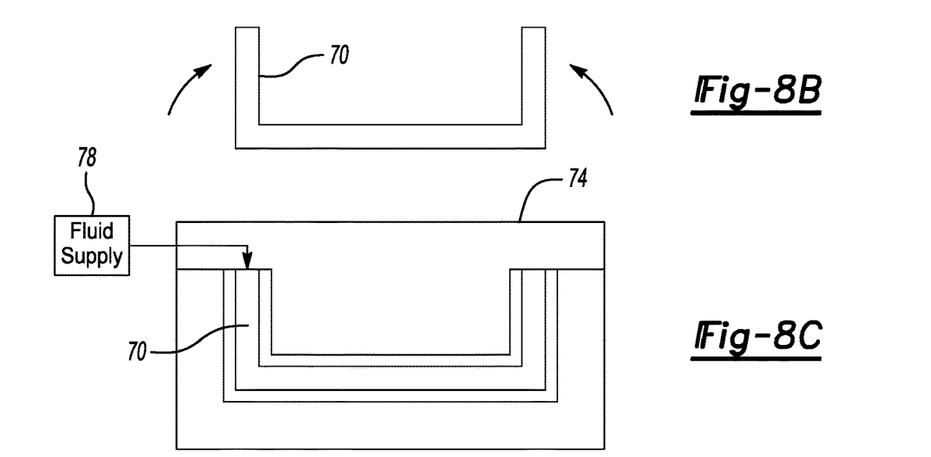
Figure 8D:
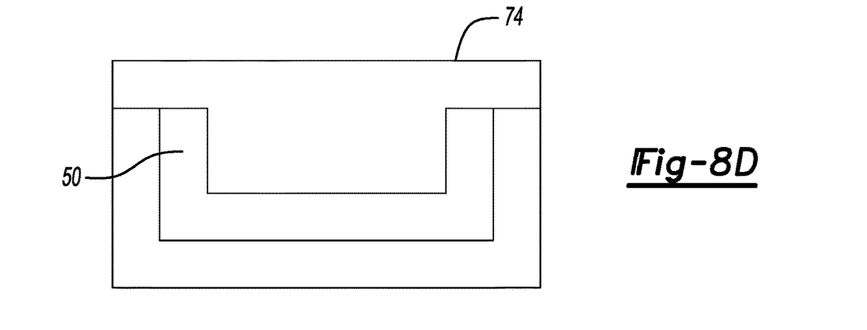

With reference now to FIGS. 8A-8G, a tailgate manufacturing method according to an exemplary embodiment of the present disclosure begins with a piece 70 of stock tube steel as shown in FIG. 8A. The tube steel is then bent as shown in FIG. 8B into a U-shaped configuration.

Figure 8E:
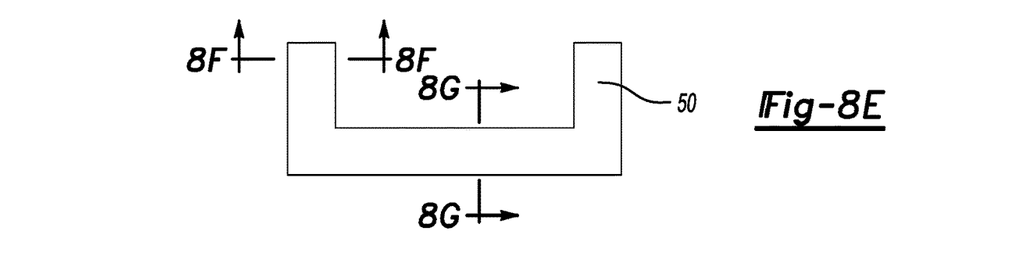
Figure 8F:
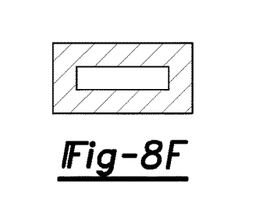
FIG. 8F is a section view taken at line 8F-8F in FIG. 8E.

As shown in FIG. 8C, the piece 70 bent into the U-shape is then placed into a hydroforming die assembly 74. Fluid from a fluid supply 78 is then pumped into an interior of the piece 70. The fluid forces the piece 70 outward against surfaces of the die assembly 74 and shown in FIG. 8D to, among other things, obtain a desired cross-section. The tube 50 can then be removed from the die assembly 74 as shown in FIG. 8E.

a section of the tube 50 extending along an inboard side of the passenger side section 36 of the driver side section 34 can have a cross-sectional profile shown in FIG. 8F. This cross-sectional profile differs from a cross-sectional profile of the tube 50 shown in FIG. 8G, which is where the tube 50 extends along a bottom of the cargo opening O. The hydroforming can facilitate forming the tube 50 with varied cross-sections.

Figure 8G:
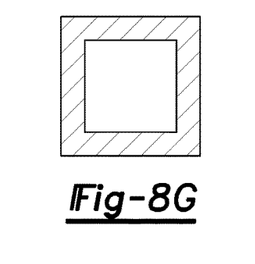
FIG. 8G is a section view taken at line 8G-8G in FIG. 8E.

In the example, the section shown in FIG. 8G is made vertically tall to help address potential bending or sagging of the passenger side section 36 and the driver side section 34. The sections of the tube 50 along the inboard sides of the driver side section 34 and the passenger side section 36 can have different profiles that facilitate the attachment of the hinge assemblies 35 (FIG. 3), latches, strikers, etc.

Features of the disclosed examples include the utilizing of a tube within a multi-access tailgate assembly. The tube can be hydroformed. Utilizing the hydroformed tube can reduce part complexity and simplify assembly. Hydroforming can provide more design flexibility as draft angles can potentially be eliminated or lessened.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A tailgate assembly, comprising:
   a frame subassembly having a cargo bed access opening disposed between a driver side section and a passenger side section, the driver side section including a driver side outer panel, the passenger side section includes a passenger side outer panel;
   a door subassembly including a door outer panel, the door subassembly pivotably coupled to the frame subassembly and is-pivotable relative to the frame subassembly back-and-forth between a door open position and a door closed position, the door subassembly closing the cargo bed access opening when the door subassembly is in the door closed position; and
   a tube of the frame subassembly, the tube extending along an inboard side of the driver side section, along an inboard side of the passenger side section, and along a bottom of the cargo bed access opening.

2. The tailgate assembly of claim 1, wherein the frame subassembly and the door subassembly are pivotable together back-and-forth between a tailgate closed position and a tailgate open position.

3. The tailgate assembly of claim 2, wherein the frame subassembly and the door subassembly pivot together about a horizontally extending axis, wherein the door subassembly pivots relative to the frame subassembly about a vertically extending axis.

4. The tailgate assembly of claim 2, wherein the bottom of the cargo bed access opening is a vertical bottom when the frame subassembly and the door subassembly are in the tailgate closed position.

5. The tailgate assembly of claim 1, wherein the door subassembly is pivotably coupled to the tube of the frame subassembly.

6. The tailgate assembly of claim 1, wherein the tube is a hydroformed tube.

7. The tailgate assembly of claim 6, wherein the tube is U-shaped.

8. The tailgate assembly of claim 1, wherein the tube extends continuously and uninterruptedly from the inboard side of the driver side section, along the bottom of the cargo bed access opening, and to the inboard side of the passenger side section.

9. The tailgate assembly of claim 1, wherein the tube is a single monolithic structure.

10. The tailgate assembly of claim 1, wherein a cross-sectional profile of the tube along the bottom of the cargo bed access opening differs from a cross-sectional profile of the tube along the inboard side of the driver side section.

11. A tailgate manufacturing method, comprising:
    hydroforming a tube to change a cross-sectional profile of the tube;
    within a tailgate assembly, connecting a driver side section of a frame subassembly to a passenger side section of the frame subassembly using the tube, the driver side section on a driver side of a cargo bed access opening in the tailgate assembly, the passenger side section on a passenger side of the cargo bed access opening in the tailgate assembly; and
    pivotably coupling a door subassembly of the tailgate assembly to the frame subassembly of the tailgate assembly so that the door subassembly is pivotable relative to the frame subassembly back-and-forth between a door open position and a door closed position, the door subassembly closing the cargo bed access opening when the door subassembly is in the door closed position,
    wherein the driver side section includes a driver side outer panel, the passenger side section includes a passenger side outer panel, and the door subassembly includes a door outer panel.

12. The method of claim 11, wherein the tube extends along a bottom of the cargo bed access opening.

13. The method of claim 12, wherein the frame subassembly and the door subassembly are pivotable together back-and-forth between a tailgate closed position and a tailgate open position, wherein the bottom of the cargo bed access opening is a vertical bottom when the frame subassembly and the door subassembly are in the tailgate closed position.

14. The method of claim 13, wherein the frame subassembly and the door subassembly pivot together about a horizontally extending axis, wherein the door subassembly pivots relative to the frame subassembly about a vertically extending axis.

15. The method of claim 11, wherein the hydroforming increases a cross-sectional area of the tube.

16. The method of claim 11, further comprising bending the tube prior to the hydroforming.

17. The method of claim 16, wherein the bending comprises bending the tube into a "U" shape.

18. The method of claim 11, wherein the tube extends continuously and uninterruptedly from an inboard side of the driver side section, along a bottom of the cargo bed access opening, and to an inboard side of the passenger side section.

19. The method of claim 11, wherein the door subassembly is pivotably coupled to the tube of the frame subassembly.

20. The method of claim 11, wherein the tube is a single monolithic structure.

* * * * *